United States Patent

Williams et al.

Patent Number: 5,730,419
Date of Patent: Mar. 24, 1998

[54] DUAL BACKSEAT VALVE ASSEMBLY

[75] Inventors: Michael R. Williams, Houston, Tex.; Jeffrey L. Mathews, Singapore; Jimmy D. Andrews, Liholiho Rise, both of Singapore

[73] Assignee: FMC Corporation, Chicago, Ill.

[21] Appl. No.: 274,079

[22] Filed: Jul. 12, 1994

[51] Int. Cl.$^6$ .......................... F16K 41/04; F16K 41/14; F16K 41/16

[52] U.S. Cl. .......................... 251/214; 251/267; 251/327; 251/328; 251/330

[58] Field of Search .......................... 251/214, 327, 251/328, 329, 330, 267, 326

[56] References Cited

U.S. PATENT DOCUMENTS

| | | | |
|---|---|---|---|
| 2,976,008 | 3/1961 | Ocker | 251/330 |
| 4,230,299 | 10/1980 | Pierce, Jr. | 251/330 |
| 4,272,055 | 6/1981 | Herd | 251/330 |
| 5,221,063 | 6/1993 | Wafer et al. | 251/330 |

*Primary Examiner*—George L. Walton
*Attorney, Agent, or Firm*—Henry C. Query, Jr.

[57] ABSTRACT

The present invention is directed to a dual backseat valve assembly comprising a valve body having an interior valve chamber and a generally horizontal flow passage; a valve gate adapted to reciprocate vertically within said valve chamber; a valve stem adapted to be received in threaded engagement with a gate lift nut mounted in said gate such that rotation of said stem causes vertical movement of said gate and a valve bonnet fixed to said valve body receiving said stem therethrough; wherein the valve stem comprises a radially extending portion defining a downward facing surface, a first enlarged diameter portion proximate the radially extending portion and a reduced diameter portion adjacent the first enlarged diameter portion; a first backseat seal comprising a radially energized seal ring fixed relative to said bonnet and having a first sealing portion for sealing against said bonnet and a second sealing portion which is adapted to be spaced apart from said reduced diameter portion when said valve is in normal operation and to engage said first enlarged diameter portion only when said stem is in a backseated position with said valve in the open position; a second backseat seal for providing a seal between said stem and said bonnet when said stem is in a backseated position with said valve in the closed position; and a structure fixed relative to said bonnet defining an upward facing surface adapted to engage said downward facing surface when said valve is in the open position to thereby tighten and lock said stem in the backseated position when said stem is moved against the fixed structure.

4 Claims, 3 Drawing Sheets

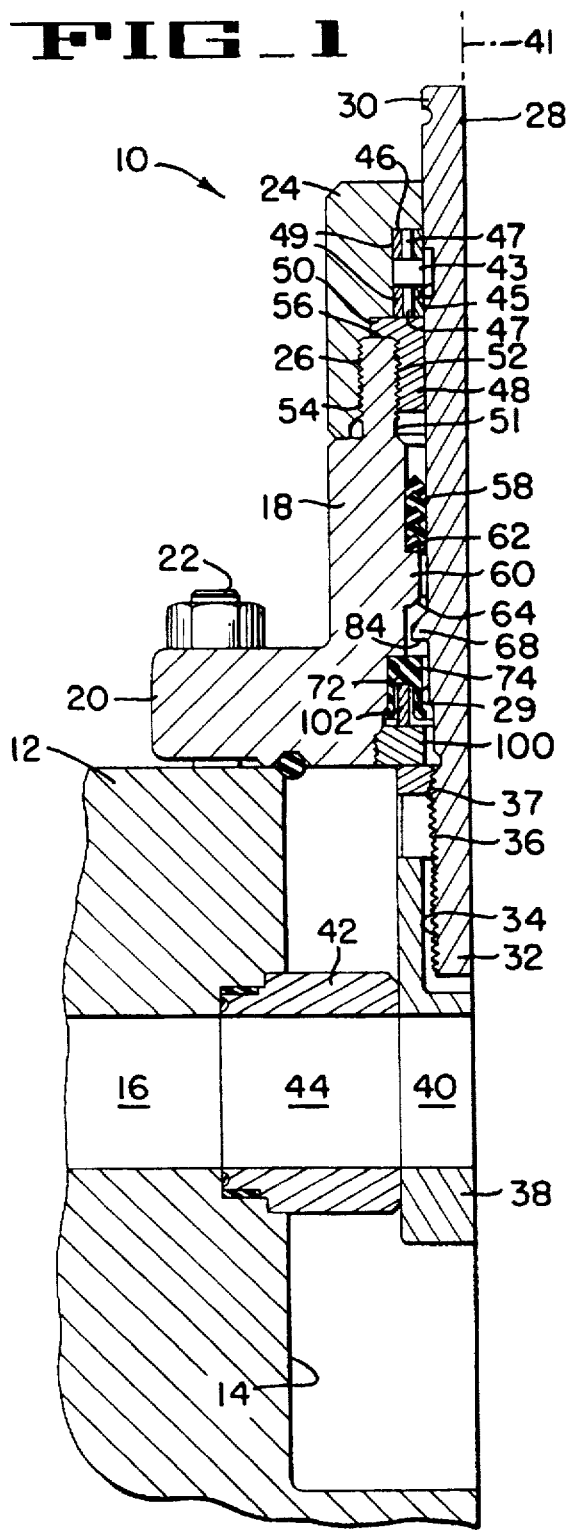
FIG_1
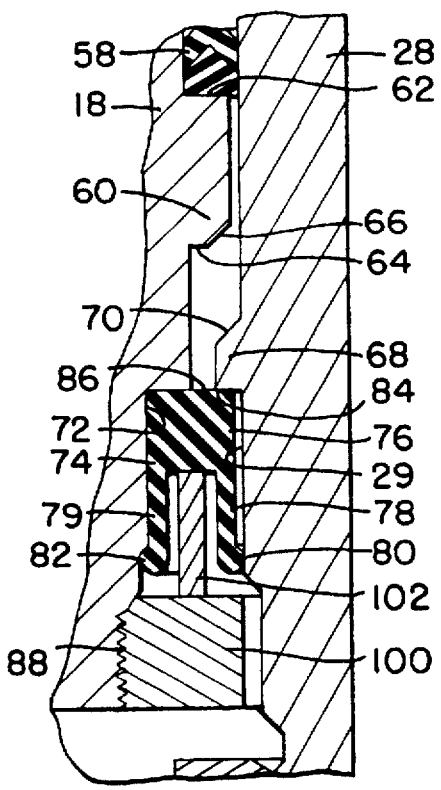
FIG_2
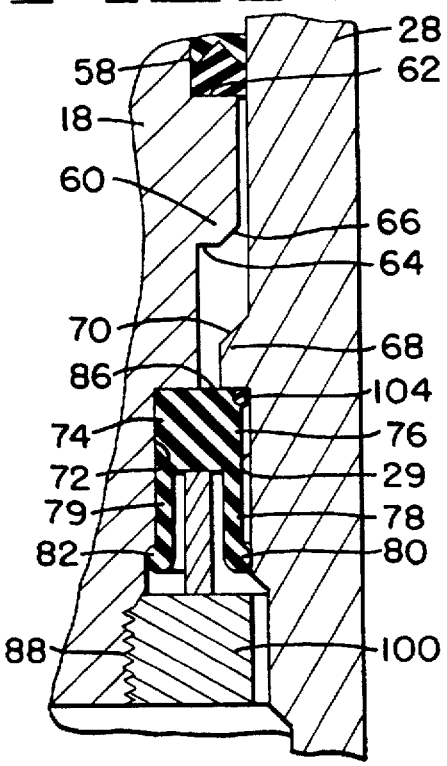
FIG_3

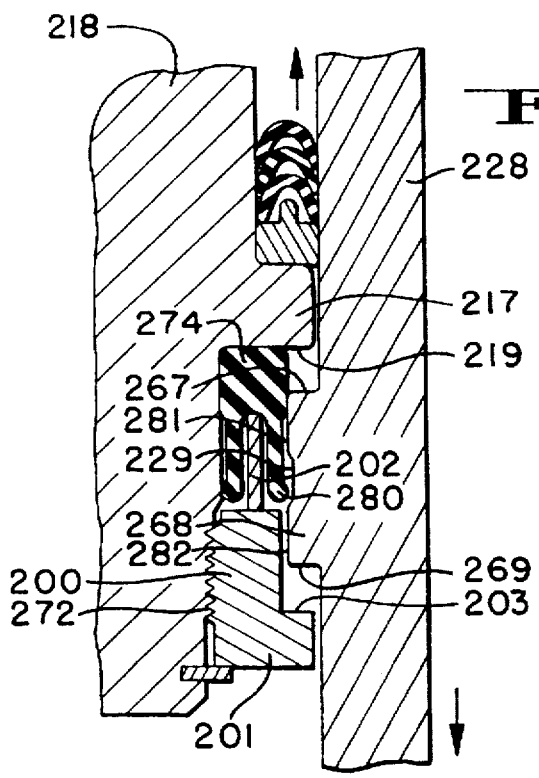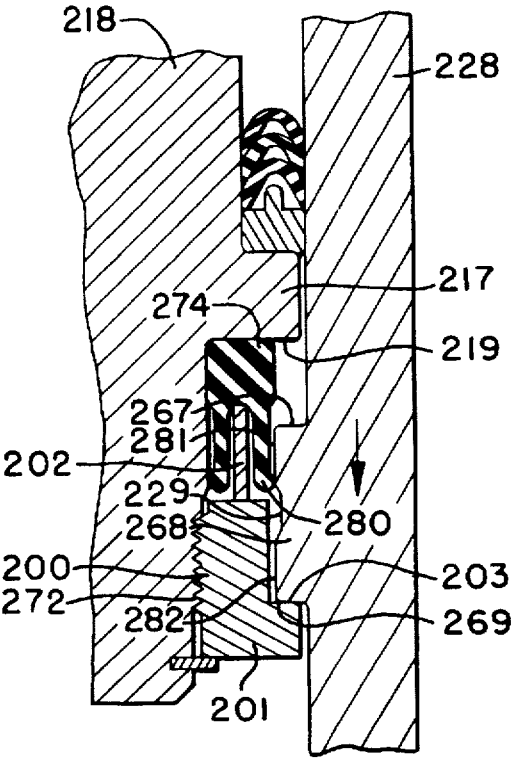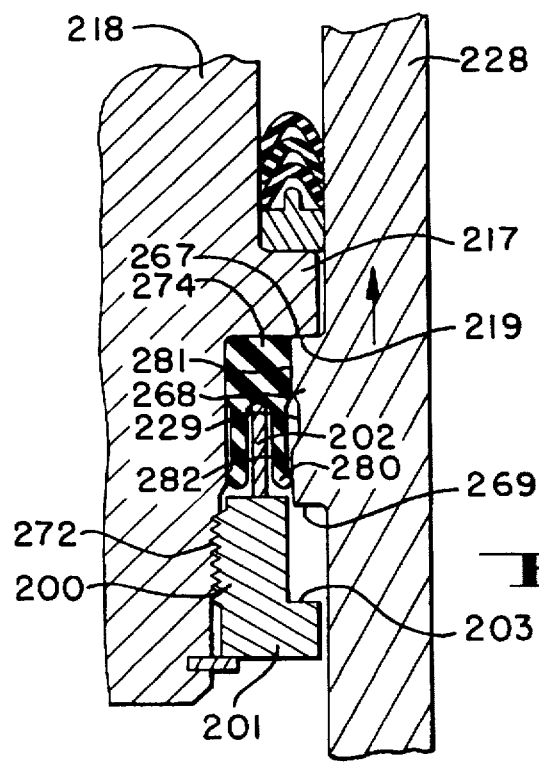

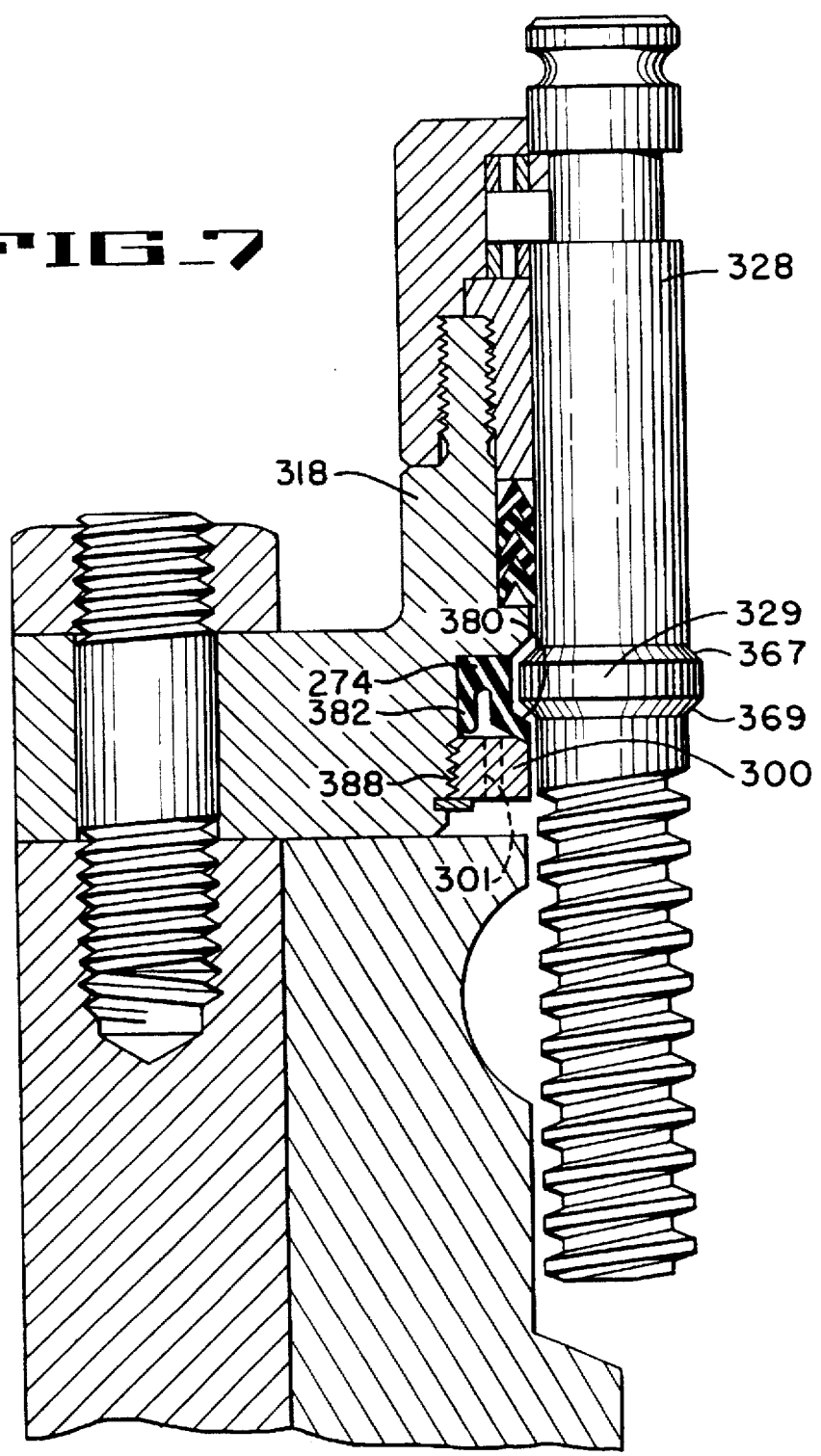

DUAL BACKSEAT VALVE ASSEMBLY

BACKGROUND OF THE INVENTION

The present invention relates to fluid control gate valves and, more particularly, to gate valves equipped to provide a reliable, locked pressure seal between the valve stem and valve bonnet regardless of whether the gate is in an open or closed position.

Gate valves typically include resilient packing around the stem forming a seal between the stem and the bonnet body in order to prevent fluid or pressure which may leak into the valve body chamber from escaping out around the valve stem. Sometimes it is desirable to replace or repair the stem packing while the valve is in service. Gate valves designed for this mode of operation often include a backseat seal which extends radially from the stem and has an annular, upwardly facing axial sealing surface that can be backseated up against an annular, downwardly facing sealing surface of the bonnet and locked in place when the gate is in the fully closed position. Others include backseat or some other secondary sealing capability to isolate the stem packing when the gate is in the open position but lack locking means for locking the backseat or secondary seal when the gate is in an open position. Because these designs lack locking means for the seal when the gate is in an open position, it is possible that the backseat or secondary seal may leak if the stem is jarred or moved during packing replacement or repair while the gate is in this position.

SUMMARY OF THE INVENTION

The present invention provides means for locking a secondary or backseat seal in place for isolating gate valve stem packing regardless of whether the gate is in an open or closed position. The various embodiments of the present invention utilize radial surface sealing means for isolating the stem packing when the valve is in the open position. In the present invention, a flexible metallic or elastomeric annular ring having resiliency in the radial direction is fitted between the stem and the bonnet body to seal off the stem packing. The seal is locked while the gate is in the open position by rotating the stem in a direction causing an upper surface of the gate to contact a surface at the bottom of the bonnet, thus preventing upward axial or radial movement of the stem.

BRIEF DESCRIPTION OF THE DRAWINGS

FIG. 1 is a central vertical half-section of a first embodiment of the gate valve assembly of the present invention with the valve in a normal operating valve open position.

FIG. 2 is an enlarged section of the gate valve assembly of FIG. 1 showing the sealing member with the gate locked in the open position.

FIG. 3 is an enlarged section of the gate valve assembly of FIG. 1 showing the sealing member and including an O-ring seal.

FIG. 4 is a central vertical half section of a second embodiment of the gate valve assembly of the present invention with the valve in a normal operating valve open position.

FIG. 5 is a central vertical half section of the gate valve assembly of FIG. 4 showing the sealing member with the gate locked in the open position.

FIG. 6 is a central vertical half section of the gate valve assembly of FIG. 4 showing the sealing member with the gate locked in the closed position.

FIG. 7 is a central vertical half section of a third embodiment of the gate valve assembly of the present invention.

DESCRIPTION OF THE PREFERRED EMBODIMENTS

As illustrated in FIG. 1, a gate valve 10 according to the present invention includes a generally annular valve body 12 having a valve cavity 14 and defining a fluid flow passage 16. A valve bonnet 18 having a flange 20 is secured to the valve body 12 by bolts 22 or similar means fastened through the flange 20. An internally threaded bonnet cap 24 is secured to the bonnet 18 by mating with external threads 26 on the bonnet or by other suitable means. A valve stem 28 is rotatably received through the valve bonnet 18 and cap 24 such that the stem 28 extends into the valve cavity 14. A first end 30 of the stem 28 is adapted to receive a handle (not shown) or other suitable torque means for selective rotation of the stem. A second end 32 of the stem 28 has external threads 34 adapted to engage an internally threaded opening 36 of a gate lift nut 37 secured in the valve gate 38. The valve gate 38 has a horizontal passage 40 adapted to be selectively aligned with the fluid flow passage 16 to open the valve 10. The gate 38 can be moved along the vertical axis 41 such that the passage 40 is out of alignment with the flow passage 16 in order to close the gate. The vertical movement of the gate 38 is effected by rotation of the stem 28 relative to the gate lift nut 37. A gate seat 42 having a seat flow passage 44 for alignment with the flow passage 16 and the horizontal passage 40 is provided to form a sealed flowpath between the gate 38 and the valve body 12. A split bearing retainer 43 is positioned in a slot 45 in the stem 28. Bearing means 46 are mounted in the bonnet 18 and around the stem 28 to rotationally support the stem 28 relative to the bonnet 18. Bearing means 46 may comprise a plurality of rollers 47 mounted in bearing races 49 or other suitable means. An annular collar 48 having a radially extending flange 50 at the upper end and external threads 52 at the lower end is telescopically received in an annular space 51 in the upper end of the bonnet 18. The bonnet 18 is provided with internal threads 54 which mate with the external threads 52 of the collar 48. The collar 48 is received such that the lower surface of the flange 50 contacts the upper end surface 56 of the bonnet 18, while bearing means 46 contact the upper surface of the flange 50. A valve stem packing assembly 58 is provided in the annular space 51 to form a seal between the stem 28 and the bonnet 18. Any of several types of known stem packing assemblies, such as disclosed in U.S. Pat. No. 4,527,806, are suitable.

As shown in FIGS. 1 and 2, the bonnet 18 is provided with a radially inward extending shoulder 60 having an upper end 62 and a lower end 64. An annular bonnet backseat sealing surface 66 is formed on a beveled lower surface of the shoulder 60. The stem 28 is provided with a radially outwardly extending portion 68 having formed on the upper surface thereof an annular stem backseat sealing surface 70. The stem backseat sealing surface 70 is adapted to engage the bonnet backseat sealing surface 66 in sealing engagement when the valve 10 is in the closed position. The bonnet 18 is provided with an inner annular groove 72 at its lower end. The groove 72 is adapted to receive annular sealing means 74. In a preferred form, sealing means 74 comprise an annular lip seal ring having a base 76 and two axially extending, oppositely opposed annular leg members 78, 79. Each leg member 78, 79 has a radially extending sealing lip 80, 82. The inner and outer lips 80, 82 sealingly engage the stem 28 and the inner surface of the groove 72, respectively, such that the leg members 78, 79 are biased radially toward each other. The stem 28 is provided with a reduced diameter section 29 such that when the stem 28 is in normal operating positions, the inner sealing lip 80 is not in contact with the stem 28, preserving the sealing means 74 until use is required. The extending portion 68 is provided with a lower surface 84 adapted to contact the upper surface 86 of the annular ring base 76 when the valve is in the open position. The inner annular groove 72 is provided with internal threads 88 at its lower end adapted to engage an externally threaded jam nut 100 provided with an annular support ring 102 extending axially upward to be received between leg members 78, 79 of the annular sealing means 74 to support the sealing means 74. The embodiment of FIG. 3 is substantially the same, except for the utilization of an o-ring 104 or similar means for isolation of grease injection pressure from sealing means 74.

In order to activate the backseat, or secondary, seal in the closed position, the bonnet cap 24 is partially unthreaded from the bonnet 18 releasing the stem 28 for vertical movement in the upward direction in FIG. 1. The stem 28 is moved upward by force exerted on it by internal valve pressure and/or by rotation of the stem 28 relative to the gate lift nut 37, until the stem backseat sealing surface 70 contacts the bonnet backseat sealing surface 66.

In order to activate the secondary seal in the open position, the stem 28 is rotated such that the gate 38 is moved to the open position until the gate 38 is in contact with either the bonnet 18 or a stop surface fixed to the bonnet 18. Next the bonnet cap 24 is removed. Then the bearings 46 and split bearing retainer 43 are removed, enabling vertical movement of the stem 28 in the downward direction of FIG. 1. Continued rotation of the stem 28 in the direction for opening the gate 38 will cause the stem to move vertically downward such that the reduced diameter section 29 is moved downward and away from the inner sealing lip 80, causing the inner sealing lip 80 to engage the stem 28, thereby activating sealing means 74. Movement of the stem 28 is continued until the bottom surface of the extending portion 68 contacts the top surface of the sealing means base 76. With the gate 38 still in contact with the bonnet 18 or stop surface, the stem 28 is rotated until it is mechanically locked and prevented from further rotation. In this position, sealing means 74 enable changing of the stem packing 58. After testing the newly installed stem packing 58, the stem 28 is rotated in the direction for closing the gate 38, causing the stem 28 to move upward allowing reassembly of the bearings 46, retainer 43, and bonnet cap 24.

A second embodiment of the invention is illustrated in FIGS. 4–6. The inner surface of the bonnet 218 is provided with a stem upstop 217 comprising a radially inward extending portion having a lower stop surface 219. An externally threaded jam nut 200 having a stem downstop 201 comprising a radially inward extending portion having an upper stop surface 203 is received in an internally threaded portion 272 of the bonnet 218. An annular support ring 202 is supported by the jam nut 200 for locating and maintaining sealing means 274. The stem 228 is provided with an extending portion 268 having upper and lower stop surfaces 267, 269 and a reduced diameter section 229.

In operation, the secondary seal provided by sealing means 274 serves in both the open or closed position. As shown in FIG. 4, the inner sealing lip 280 does not contact the stem 228 during normal operation because the reduced diameter section 229 provides for a range of stem movement without contact.

When backseating or secondary sealing is desired in the valve open position, the stem 228 is advanced fully downward until the lower stop surface 269 of the stem 228 contacts the upper stop surface 203 of the downstop 201. The inner lip 280 contacts an upper circumferential surface 281 of the extending portion 268, forming a seal therewith. The stem 228 is rotated until it is mechanically locked, enabling replacement and testing of the stem packing 258.

When backseating or secondary sealing is desired in the valve closed position, the stem 228 is advanced fully upward until the upper stop surface 267 of the stem 228 contacts the lower stop surface 219 of the downstop 201. The inner lip 280 contacts a lower circumferential surface 282 of the extending portion 268, forming a seal therewith. The stem 228 is rotated until it is mechanically locked, enabling replacement and testing of the stem packing 258.

A third embodiment of the invention is illustrated in FIG. 7. The procedure for backseating in the open and closed positions is the same for this embodiment as for the first embodiment described above. A stem 328 has an enlarged diameter portion 329 provided with upper and lower backseat sealing surfaces 367, 369. The bonnet 318 is provided with internal threads 388 for engagement with a threaded jam nut 300. The jam nut 300 is adapted to locate and maintain sealing means 274. Preferably, sealing means 274 comprise an annular seal having an outer sealing lip 382 and an inner seal surface 380. The outer lip 382 forms a seal with the inside of the bonnet 318. The seal surface 380 is adapted to engage the lower backseat sealing surface 369 when the stem 328 is lowered into a valve open position. The jam nut 300 is provided with a plurality of channels or vents 301, preferably uniformly spaced and centered, for channeling internal pressure underneath the seal 274 thereby increasing sealing contact pressure with the lower backseat sealing surface 369.

Although the preferred embodiments of the present invention have been herein shown and described, it is clear that variation and modification can be made without departing from what is regarded to be the subject matter of the invention.

We claim:

1. A dual backseat valve assembly comprising:

a valve body having an interior valve chamber and a generally horizontal flow passage;

a valve gate adapted to reciprocate vertically within said valve chamber, said gate having a generally horizontal opening therethrough adapted to move into and out of alignment with said flow passage to effect an open or closed valve position;

a valve stem adapted to be received in threaded engagement with a gate lift nut mounted in said gate such that rotation of said stem causes vertical movement of said gate;

a valve bonnet fixed to said valve body receiving said stem therethrough;

a stem packing assembly mounted in said bonnet and adapted to form a seal between said stem and bonnet;

said valve stem comprising a radially extending portion defining a downward facing surface, a first enlarged diameter portion proximate the radially extending portion and a reduced diameter portion adjacent the first enlarged diameter portion;

first backseat seal means comprising a radially energized seal ring fixed relative to said bonnet and having a first sealing portion for sealing against said bonnet and a second sealing portion which is adapted to be spaced apart from said reduced diameter portion when said valve is in normal operation and to engage said first enlarged diameter portion only when said stem is in a backseated position with said valve in the open position;

second backseat seal means for providing a seal between said stem and said bonnet when said stem is in a backseated position with said valve in the closed position; and means fixed relative to said bonnet defining an upward facing surface adapted to engage said downward facing surface when said valve is in the open position to thereby tighten and lock said stem in the backseated position when said stem is moved against said fixed means.

2. The dual backseat valve assembly of claim 1, wherein said upward facing surface means is defined by a top surface of said radially energized seal ring.

3. The dual backseat valve assembly of claim 1, wherein said second backseat seal means comprises a second enlarged diameter portion adjacent said reduced diameter portion of said stem and wherein said second sealing portion of said seal ring is adapted to engage said second enlarged diameter portion when said stem is in a backseated position with said valve in the closed position.

4. The dual backseat valve assembly of claim 3, wherein said upward facing surface means comprises a jam nut which is secured in said bonnet.

* * * * *